United States Patent [19]

Piestert et al.

[11] 4,263,419

[45] Apr. 21, 1981

[54] ADHESIVE COMPOSITION

[75] Inventors: Gerhard Piestert, Schriesheim; Heinz G. Gilch, Bad Homburg-Kirdorf, both of Fed. Rep. of Germany

[73] Assignee: USM Corporation, Farmington, Conn.

[21] Appl. No.: 83,676

[22] Filed: Oct. 11, 1979

[30] Foreign Application Priority Data

Jun. 11, 1978 [GB] United Kingdom ............... 43368/78

[51] Int. Cl.³ .............................................. C08L 23/00
[52] U.S. Cl. ................................... 525/305; 156/334; 525/309; 525/344
[58] Field of Search ........................ 525/305, 309, 344

[56] References Cited

U.S. PATENT DOCUMENTS

| 3,594,451 | 7/1971 | Keown | 525/292 |
| 3,890,407 | 6/1975 | Briggs, Jr. et al. | 525/265 |
| 3,962,372 | 6/1976 | Arhart | 525/244 |
| 4,112,013 | 9/1978 | Briggs, Jr. et al. | 525/305 |

*Primary Examiner*—Morton Foelak
*Attorney, Agent, or Firm*—John P. Morley; Vincent A. White

[57] ABSTRACT

An adhesive composition formed by combining two parts capable of causing polymerization to form adhesive bonds rapidly. One part comprises polymerizable vinyl monomer, selected chloro-sulphonated polyethylenes or mixtures of sulphonyl chlorides and chlorinated polyethylenes, compatible monomeric material having three or more ethylenically unsaturated double bonds. The other part comprises an activator.

18 Claims, No Drawings

ADHESIVE COMPOSITION

THE FIELD OF THE INVENTION

This invention relates to adhesives. More precisely, the invention relates to improved reactive fluid adhesive compositions.

DESCRIPTION OF THE PRIOR ART

Reactive fluid adhesive compositions are known which are at least substantially solvent free, and cure by polymerization of monomeric components to provide strong adhesive bonds between surfaces of many different materials. These adhesive compositions may comprise two parts: one part comprising polymerizable acrylate or methacrylate ester monomers and a source of free radicals such as a peroxide or hydroperoxide and the other part comprising an activator for initiation of polymerization of the monomers at room temperature. The activator is conveniently one which can be used in nonstoichiometric quantities with respect to the monomers.

In one particularly convenient method of using reactive fluid adhesives, the part comprising the activator may be applied to the surfaces to be bonded in the manner of a primer prior to the application of the other or first part of the composition comprising the polymerizable monomers. This method allows the use of the adhesive composition without having to mix the two parts prior to application.

U.S. Pat. No. 3,890,407, describes and claims adhesive compositions comprising a solution of certain sulpur bearing compositions selected from chlorosulphonated polyethylene and a mixture of sulphonyl chloride with chlorinated polyethylene in at least one polymerizable vinyl monomer, for example methyl methacrylate monomer. According to U.S. Pat. No. 3,890,407, the sulfur bearing composition can contain between about 20 to about 70 weight percent chlorine.

Although adhesive compositions of this type have excellent bonding and performance characteristics, they do not generally provide an adhesive which sets sufficiently within 20 seconds of application to provide an acceptable handleable bond to a variety of surfaces. This disadvantage is particularly significant under production line conditions where it is highly desirable that adhesively bonded articles are bonded strongly enough for handling immediately after the parts to be bonded have been pressed together. This disadvantage is believed to result from the fact that polymerization of the monomers used in such a method begins at the surfaces of the layers of the two parts of the composition, where the monomers, peroxide and activators are in contact, and continued polymerization through the monomer containing layer is hindered by a number of factors. These hindering factors are considered to be related to the nature of the chemical ingredients used, their physical disposition to each other in the composition and the characteristics of the curing phenomenon.

A known method for increasing the speed of reaction of polymerizable compositions including acrylic monomers involves including minor proportions of polyunsaturated monomers in the composition to provide an increased quantity of potentially reactive sites. However, large quantities of such monomers tend to lead to cross-linked structures which in extreme cases tend to be hard and brittle and accordingly unsuitable for many adhesive applications. Moreover, polyunsaturated monomers such as diunsaturated monomers are generally so incompatible with chlorosulphonated polyethylenes as to preclude their use in large quantities in adhesives such as those described in U.S. Pat. No. 3,890,407 while tri- and higher polyunsaturated monomers are generally regarded as more incompatible.

SUMMARY OF THE INVENTION

The adhesive compositions of the present invention include first part compositions which are homogeneous solutions comprising selected sulfur-bearing compositions and substantial quantities of certain compatible polyunsaturated acrylic monomer materials in controlled proportions in vinyl monomer. The combination of a first part composition with an activator forms an adhesive composition which sets within as little as ten seconds to provide adhesive bonds of acceptable strength, and continues to cure to an acceptable bond strength over a period of several hours.

DESCRIPTION OF PREFERRED EMBODIMENTS

Homogeneous solution compositions providing a first part for adhesive compositions of the present invention comprise vinyl monomers polymerizable by a free radical mechanism. For the purpose of this invention "vinyl monomers" include acrylic monomers and mixtures of monomers, such as methyl methacrylate, ethyl methacrylate, acrylonitrile, methacrylonitrile, methyl acrylate, ethyl acrylate, butyl metahacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate itaconic acid, ethylene glycol and higher-glycol acrylates and methacrylates, acrylamide, and methacrylamide, halogenated monomers such as vinylidene chloride, chlorostyrene, 2,3-dichloro-1,3-butadiene, and 2-chlor-1,3-butadiene, and styrene and mono- and polyalkylstyrenes, such as methylstyrene, dimethylstyrene, ethylstyrene, or tert-butylstyrene. Some of the aforementioned compounds are not, from a strictly chemical standpoint, "vinyl" monomers, but are regarded as such in the plastics art. The term "vinyl monomers" is used here in this broadened sense.

The preferred monomers are acrylate monomers, (i.e. esters of acrylic or methacrylic acid), especially $c^{1-8}$ alkyl acrylates and methacrylates.

A source of free radicals such as an organic peroxide (e.g. an organic hydroperoxide), a perester, or a peracid may also be included in the homogeneous solution. The preferred material is cumene hydroperoxide.

First part homogeneous solution compositions providing adhesive compositions of this invention also include sulfur-bearing compositions selected from chlorosulfonated polyethylene or a mixture of chlorinated polyethylene and sulfonyl chloride. The selected sulfur-bearing composition has a comparatively high chlorine content in order to achieve necessary compatability and reaction characteristics. Preferably, the chlorine content of the selected sulfur-bearing composition should be no less than about 35% by weight and the sulfur content should be greater than about 1.0% by weight. The selected sulfur-bearing composition is preferably used in amounts from about 20 to about 40% by weight of the first part composition. While larger amounts of the selected sulfur-bearing composition generally tend to lead to faster setting and higher tensile shear values, increasingly large amounts also tend to interfere with stability of the solutions. Smaller amounts of the selected sulfur-bearing composition tend to lead to first part compositions having viscosities which are too low for many adhesive purposes. A particularly preferred adhesive composition includes 30 to 35% by weight of the first part compositions of a chlorosulphonated polyethylene supplied by DuPont de Nemours Company under the Trade Name Hypalon 30, which is stated to have a chlorine content of 43% by weight, a sulphur content of 1.1% by weight and a Mooney viscosity of 30.

First part homogeneous solution compositions providing adhesive compositions of the present invention also include a compatible polyunsaturated monomeric material having three or more ethylenically unsaturated double bonds in its molecular chain. Additionally, the compatible monomeric material is one which can be mixed with the selected sulfur-bearing composition and vinyl monomer(s) to provide a homogeneous single liquid phase composition stable at temperatures between about 10° C. to about 30° C. over a period in excess of three months. Accordingly, for the purposes of this invention, "compatible polyunsaturated monomeric material" means a monomeric material having three or more ethylenically unsaturated double bonds in its molecular chain and which when mixed into a solution of Hypalon 30 in methyl methacrylate and acrylic acid to an extent that the solution comprises 20% by weight of the polyunsaturated monomeric material, does not separate when stored for three months in a sealed glass bottle at 20° C. Trimethylol propane trimethacrylate is a particularly preferred compatible polyunsaturated monomeric material which meets this definition. An example of a polyunsaturated monomeric material which does not meet the defined compatibility criterion is pentraacrythritol tetracrylate.

First part compositions according to the invention also comprise 1.0 to 30% by weight of a compatible organic acid. Preferred acids are also vinyl compounds as above referred to, for example acrylic or methacrylic acid. The first part compositions may also include 0.01 to 10% by weight of stabilizers for example hydroquinone or 2,6-di-t-butyl-4-methylphenol.

The first part homogeneous solution compositions described above are combined with a second part composition comprising an activator to provide the adhesive compositions of this invention.

Activator compounds suitable for use in the second part may include for example a tertiary amine such as N,N-dimethylaniline, N,N-diethylaniline, N,N-diisopropyl (p-toluidine), or a condensation product of an aldehyde and a primary or secondary amine such as a condensation product of butyraldehyde with aniline or butylamine, or a condensation product of crotonaldehyde and aniline. Examples of suitable activators include DuPont accelerators 808 and 833, and Vulcazit 576 from Bayer AG.

Rapid setting of bonds to a finger-tight condition is achieved with second part compositions which include a promoter in combination with the activator. Suitable promotors capable of shortening the time required for curing of the adhesive composition include oxidizable organic compounds of transition metals such as cobalt, nickel, manganese. Other suitable promotors include iron naphthenates, copper octoate, iron hexoate, or iron propionate, or complexes of acetyl acetone with iron, copper, cobalt or vanadium.

Manners of making and using the invention as well as advantages derived from practicing the invention will be more fully appreciated from the following Examples presented to illustrate and not to limit the invention.

In the Examples, the adhesive composition was provided by combining a first part homogeneous solution composition with a second part composition including an activator. Each first part composition comprised ingredients in amounts by weight shown in Table 1 (First Part Compositions I–VI). These ingredients provided a homogeneous solution in vinyl monomer comprising methyl methacrylate as solvent, of 20 to 40% by weight of the solution of Hypalon 30, and 5 to 25% by weight of the solution of a compatible polyunsaturated monomeric material namely trimethylol propane trimethacrylate.

As will be seen from Table 1, for First Part Compositions I–VI, the ratio by weight of Hypalon 30 (H) to methyl methacrylate (M) lies in the range 1:0.9 to 1:1.5 the ratio by weight of Hypalon 30 to trimethylolpropane trimethacrylate (T) lies in the range 1:0.1 to 1:1, and the ratio by weight of methyl methacrylate (M) to trimethylol propane trimethacrylate (T) lies in the range 1:0.1 to 1:0.6. Further, the ratio by weight of (H) and (T) to vinyl monomer lies in the range 1:1.2 to 1:0.8.

EXAMPLE 1

Setting time and shear strength was examined of steel to steel bonds formed by combining First Part Compositions I–VI with a second part comprising a solution in acetone of 10% by weight DuPont Accelerator 808 and 0.1% vanadium acetonyl acetonate. It was observed that setting time was reduced when the higher quantities of Hypalon and trimethylol propane were present, and bond strength was increased when the higher quantities of Hypalon were present.

For these tests, sample bonds were formed from steel coupons 100 mm×25.4 mm overlapping by 12.7 mm with the adhesive between the overlapping portions. The steel coupons were prepared by sand blasting, rinsing with acetone and drying in air at room temperature. The second part was then painted onto the coupons and allowed to dry by evaporation of the solvent. The first part (Composition I–VI) was then applied as a thin coating on one of the coupons. The steel coupons were then pressed together firmly with the adhesive between them.

The setting time was determined by forming the bond and observing the period of time, in seconds, during which it remained possible for the observer to open the bond with his fingers by moderate hand power.

Shear strength of the sample bonds were determined at 20° C. (in Newtons per square mm) 24 hours after forming the sample bonds. An Instron machine set to peel the bonds apart at a rate of 1 mm per minute was used.

Results of these tests are shown in graph form in FIGS. 1, 2 and 3. FIG. 1 shows the setting time for adhesive compositions comprising Compositions I, II, III and IV as a first part and in which the contents of Hypalon 30 (H) and acrylic acid (A) are maintained at a constant level and the contents of methyl methacrylate (M) and trimethlol propane trimethacrylate (T) are varied. In this FIG. 1 the setting time is plotted against the amount of (T) present as a percentage by weight in the solution. It can be seen from FIG. 1 that the setting time is reduced with increasing content of trimethylolpropane trimethacrylate, and that amounts in excess of 15% by weight of the solution provide exceptionally fast setting adhesives with settng times of 20 seconds or less.

FIG. 2 shows the setting time for adhesive compositions comprising Compositions IV, V and VI, as a first part and in which the contents of trimethylolpropane trimethacrylate and acrylic acid are maintained at a constant level and the contents of Hypalon (H) and methyl methacrylate are varied. In this FIG. 2 the setting time is plotted against the amount of (H) present as a percentage by weight in the solution. It can be seen from FIG. 2 that the setting time is reduced with increasing content of Hypalon 30, and that amounts in excess of 25% by weight of the solution provide exceptionally fast setting adhesives with setting times of 15 seconds or less.

FIG. 3 shows the tensile shear strength of adhesive compositions comprising Compositions IV, V and VI as a first part. The tensile shear strength is plotted against the amount of (H) present as a percentage by weight of the solution. It can be seen from FIG. 3 that the bond strength is increased with increasing content of Hypalon 30.

EXAMPLE 2

Composition IV was used to prepare adhesive compositions as described in Example 1 using the same second part as in Example 1. The sample bonds were subjected to the tensile shear test five minutes after formation of the bond, and 60 minutes after formation of the bond. Results of 9.5 and 12.0 N/mm² respectively were recorded.

EXAMPLE 3

Composition IV was used to prepare adhesive compositions as described in Examples 1 and 2 but using as a second part, either a solution in acetone of 10% by weight Accelerator 808 and 0.1% Cu(II) acetylacetonate. Setting times of 5 to 10 seconds were observed in both cases.

TABLE I

| Example Adhesives - Part A. | | | | | | |
|---|---|---|---|---|---|---|
| | I | II | III | IV | V | VI |
| Chlorosulphonated polyethylene (H) | 35 | 35 | 35 | 35 | 25 | 30 |
| Methyl methacrylate (M) | 50 | 45 | 40 | 35 | 45 | 40 |
| Trimethylol propane trimethacrylate (T) | 5 | 10 | 15 | 20 | 20 | 20 |
| Acrylic acid (A) | 10 | 10 | 10 | 10 | 10 | 10 |
| Cumene hydroperoxide | 1 | 1 | 1 | 1 | 1 | 1 |
| 2.6.di-t-butyl-4-methyl phenol | 0.5 | 0.5 | 0.5 | 0.5 | 0.5 | 0.5 |
| Ratio of:- | | | | | | |
| H:M | 1:1.43 | 1:1.28 | 1:1.14 | 1:1 | 1:1.8 | 1:1.3 |
| H:T | 1:0.13 | 1:0.28 | 1:0.43 | 1:0.57 | 1:0.8 | 1:0.67 |
| M:T | 1:0.1 | 1:0.22 | 1:0.38 | 1:0.57 | 1:0.22 | 1:0.5 |

TABLE I-continued

| Example Adhesives - Part A. | | | | | | |
|---|---|---|---|---|---|---|
| | I | II | III | IV | V | VI |
| H+T: A+M | 1:1.5 | 1:1.22 | 1:1 | 1:0.82 | 1:1.2 | 1:1 |

Having thus described our invention, what we claim as new and desire to secure by Letters Patent of the United States is:

1. A composition which can be combined with an activator to form an adhesive and which comprises a homogeneous solution in vinyl monomer material which is polymerizable to a solid by free radicals of:
   (a) not less than about 20% by weight of the composition of a sulfur-bearing composition selected from chlorosulfonated polyethylene or a mixture of sulfonyl chloride and chlorinated polyethylene and,
   (b) not less than 5% by weight of the composition of a compatible polyunsaturated monomeric material having three or more ethylenically unsaturated double bonds in its molecular chain.

2. A composition of claim 1 where the sulfur bearing composition comprises from about 20 to abut 40% by weight of the composition.

3. A composition of claim 1 where the sulfur-bearing composition has a chlorine content of not less than about 35% by weight and a sulfur content greater than about 1.0% by weight.

4. A composition of claim 1 where the compatible polyunsaturated monomeric material comprises trimethylol propane trimethacrylate in an amount of 10 to 20% by weight of the composition.

5. A composition of claim 1 where the vinyl monomer comprises methyl methacrylate.

6. A composition of claim 1 where the vinyl monomer comprises methyl methacrylate and acrylic acid.

7. A composition of claim 1 including cumene hydroperoxide.

8. A composition of claim 1 including 2,6 di-t-butyl-4-methyl phenol.

9. A composition of claim 1 including cumene hydroperoxide and 2.6 di-t-butyl-4 methyl phenol.

10. A composition of claim 1 where the ratio by weight of (a) to (b) lies in the range 1:0.1 to 1:1, and the ratio by weight of (a) and (b) to vinyl monomer lies in the range 1:1.2 to 1:0.8.

11. An adhesive forming composition comprising a homogeneous solution of
   (i) a free radical polymerizable monomer(s);
   (ii) not less than about 20% by weight of the composition of a chlorosulphonated polyethylene or a mixture of sulphonyl chloride with chlorinated polyethylene having a chlorine content of not less than 35% and a sulphur content greater than 1%;
   (iii) not less than about 20% by weight of the composition of a trimethylol propane trimethacrylate;
   (iv) a source of free radicals;
   (v) a free radical polymerization inhibitor(s) and, the components (ii) and (iii) being present in a ratio by weight of from 1:0.1 to 1:1 and the components (i), (ii) and (iii) being present in amounts such that the ratio by weight of components (ii) and (iii) to (i) lies in the range 1:1.2 to 1:0.8.

12. A composition of claim 11 where the chlorosulfonated polyethylene or mixture of sulfonyl chloride with chlorinated polyethylene is present in an amount between about 20 to about 40% by weight of the composition.

13. A composition of claim 11 where the trimethylol propane trimethacrylate is present in an amount between about 20 to about 40% by weight of the composition.

14. A composition of claim 11 where the free radical polymerizable vinyl monomer(s) comprise methyl methacrylate.

15. A composition of claim 11 where the free radical polymerizable vinyl monomer(s) comprise methyl methacrylate and acrylic acid.

16. A composition of claim 11 where the source of free radicals comprises cumene hydroperoxide.

17. A composition of claim 11 where the free radical polymerization inhibitor(s) comprises 2,6 di-t-butyl-4 methyl phenol.

18. A composition of claim 11 where the source of free radicals comprises cumene hydroperoxide and the free radical polymerization inhibitor(s) comprises 2,6 di-t-butyl-4 methyl phenol.

* * * * *

UNITED STATES PATENT AND TRADEMARK OFFICE
CERTIFICATE OF CORRECTION

PATENT NO. : 4,263,419

DATED : April 21, 1981

INVENTOR(S) : Gerhard Piestert et al.

It is certified that error appears in the above—identified patent and that said Letters Patent is hereby corrected as shown below:

Insert Sheet 1 of drawings which contains Figures 1 - 3.
See Attachment

On The Title Page, "18 Claims, No Drawings" should read -- 18 Claims  3 Drawing Figures --.

Signed and Sealed this

Twenty-fourth Day of November 1981

[SEAL]

Attest:

GERALD J. MOSSINGHOFF

Attesting Officer

Commissioner of Patents and Trademarks

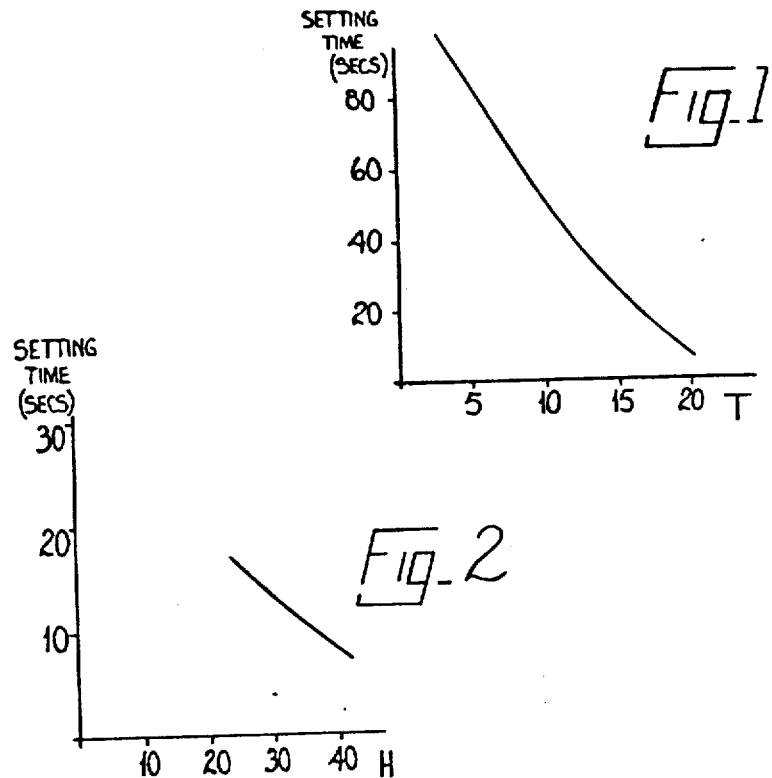
Fig. 1
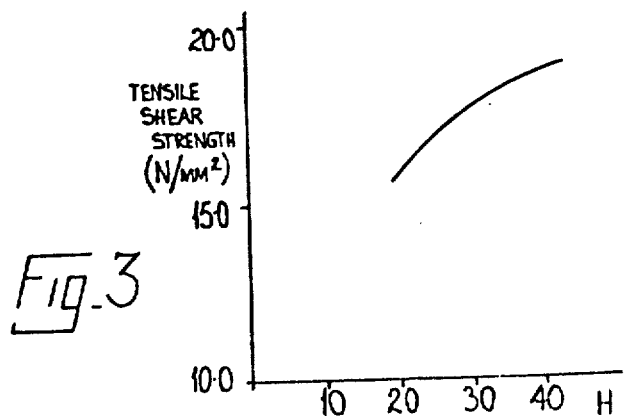
Fig. 2
Fig. 3